United States Patent
Aronsson et al.

(10) Patent No.: US 9,951,692 B2
(45) Date of Patent: Apr. 24, 2018

(54) SUPPORT STRUCTURE FOR A GAS TURBINE ENGINE

(75) Inventors: Egon Aronsson, Bratlanda (SE); Per Widstrom, Grastorp (SE); Elinor Magnusson, Frandefors (SE); Johan Tholérus, Trollhattan (SE); Christian Lundh, Stenungsund (SE)

(73) Assignee: GKN Aerospace Sweden AB, Trollhattan (SE)

( * ) Notice: Subject to any disclaimer, the term of this patent is extended or adjusted under 35 U.S.C. 154(b) by 826 days.

(21) Appl. No.: 14/367,324

(22) PCT Filed: Dec. 23, 2011

(86) PCT No.: PCT/SE2011/000245
§ 371 (c)(1),
(2), (4) Date: Sep. 16, 2014

(87) PCT Pub. No.: WO2013/095211
PCT Pub. Date: Jun. 27, 2013

(65) Prior Publication Data
US 2014/0373556 A1 Dec. 25, 2014

(51) Int. Cl.
*F02C 7/20* (2006.01)
*F01D 25/16* (2006.01)
(Continued)

(52) U.S. Cl.
CPC .............. *F02C 7/20* (2013.01); *B23K 1/0018* (2013.01); *B23K 1/0056* (2013.01); *B23K 31/02* (2013.01);
(Continued)

(58) Field of Classification Search
CPC ... F02C 7/20; F01D 25/28; F01D 9/02; F01D 9/04; F01D 25/24; F01D 25/246;
(Continued)

(56) References Cited

U.S. PATENT DOCUMENTS 2,938,342 A * 5/1960 Lombard ................ F01D 9/065
60/796
4,793,770 A * 12/1988 Schonewald ............. F01D 9/04
415/142
(Continued)

FOREIGN PATENT DOCUMENTS

EP 0344877 A1 12/1989
EP 1247944 A2 9/2002
(Continued)

OTHER PUBLICATIONS

PCT International Search Report and Written Opinion (PCT/SE2011/000245) dated Dec. 23, 2011 (10 pages).

*Primary Examiner* — Ehud Gartenberg
*Assistant Examiner* — Thomas Burke
(74) *Attorney, Agent, or Firm* — Bejin Bieneman PLC (57) ABSTRACT

The present invention relates to a support structure (16) for a gas turbine engine (1). The support structure (16) has an axial extension in an axial direction (A) and a circumferential extension in a circumferential direction (C). Moreover, the support structure (16) comprises a plurality of tubular members (18, 20) of a first material type arranged in sequence in the circumferential direction (C). Each tubular member (18, 20) at least partially delimits a flow guiding passage extending at least partially in the axial direction (A). The support structure (16) comprises a leading portion (22) and a trailing portion (24) in the axial direction (A). Furthermore, the support structure (16) comprises a leading edge member (26) of a second material type, the leading edge member (26) being located at the leading portion (22). At least two of the tubular members (18, 20) are fixedly attached to a leading edge member (26). According to the present invention, the first material type is different from the second material type.

18 Claims, 10 Drawing Sheets

(51) Int. Cl.
  *F01D 9/02*      (2006.01)
  *F01D 5/14*      (2006.01)
  *B23K 1/00*      (2006.01)
  *B23K 1/005*     (2006.01)
  *B23K 31/02*     (2006.01)
  *F01D 25/28*     (2006.01)
  *F01D 9/04*      (2006.01)
  *B23K 101/00*    (2006.01)

(52) U.S. Cl.
  CPC ............ *F01D 5/147* (2013.01); *F01D 9/02* (2013.01); *F01D 9/042* (2013.01); *F01D 9/044* (2013.01); *F01D 25/162* (2013.01); *B23K 2201/001* (2013.01); *F01D 9/04* (2013.01); *F01D 25/28* (2013.01); *F05D 2230/21* (2013.01); *F05D 2230/232* (2013.01); *F05D 2230/25* (2013.01); *F05D 2300/6033* (2013.01); *Y02T 50/672* (2013.01); *Y10T 29/49229* (2015.01)

(58) Field of Classification Search
  CPC ......... F01D 25/243; F02K 1/04; B64D 33/04; F05D 2240/91; F05D 2260/30
  See application file for complete search history.

(56) References Cited

U.S. PATENT DOCUMENTS

| | | | |
|---|---|---|---|
| 5,357,744 A * | 10/1994 | Czachor | F01D 9/065 415/134 |
| 5,483,792 A | 1/1996 | Czachor et al. | |
| 2003/0033813 A1* | 2/2003 | Flatman | F01D 5/146 60/774 |
| 2004/0103534 A1 | 6/2004 | Lundgren et al. | |
| 2005/0241149 A1* | 11/2005 | Lundgren | B23P 15/006 29/889.22 |
| 2006/0277922 A1* | 12/2006 | Durocher | F01D 25/005 60/805 |
| 2006/0288707 A1* | 12/2006 | Weaver | F01D 9/023 60/796 |
| 2007/0241257 A1* | 10/2007 | Eleftheriou | F01D 25/162 248/554 |
| 2008/0022692 A1 | 1/2008 | Nagendra et al. | |
| 2008/0134687 A1 | 6/2008 | Kumar et al. | |
| 2008/0202124 A1* | 8/2008 | Sutcu | F01D 9/023 60/796 |
| 2009/0101787 A1 | 4/2009 | Dierberger | |
| 2010/0206982 A1* | 8/2010 | Moore | B64C 11/48 244/62 |
| 2011/0044798 A1* | 2/2011 | Digard Brou De Cuissart | F01D 9/041 415/115 |
| 2011/0283711 A1* | 11/2011 | Petersson | F01D 9/041 60/796 |
| 2013/0055725 A1* | 3/2013 | Rauch | F01D 25/30 60/796 |

FOREIGN PATENT DOCUMENTS

| | | |
|---|---|---|
| EP | 1482130 | 12/2004 |
| EP | 1845237 | 10/2007 |
| EP | 1930555 | 6/2008 |
| EP | 2148046 | 1/2010 |
| EP | 2233697 A2 | 9/2010 |
| GB | 918692 A | 2/1963 |
| GB | 2226086 A | 6/1990 |
| GB | 2226600 A | 7/1990 |
| WO | 2004016911 A1 | 2/2004 |
| WO | 2005012696 A1 | 2/2005 |
| WO | 2005116405 A1 | 12/2005 |
| WO | 2010123413 A1 | 10/2010 |

* cited by examiner

SUPPORT STRUCTURE FOR A GAS TURBINE ENGINE

CROSS-REFERENCE TO RELATED APPLICATION

This application claims priority to, and is a National Phase of, International Application No. PCT/SE2011/000245, filed on Dec. 23, 2011, which is hereby incorporated by reference in its entirety.

TECHNICAL FIELD

The present disclosure relates to a support structure of a gas turbine engine of an aeroplane. Furthermore, the present disclosure relates to a method for constructing a support structure.

BACKGROUND

Gas turbine engines are known in the art. The expression "gas turbine engine" is meant to include various types of engines which admit air at relatively low velocity, heat it by combustion and expel it at a higher velocity. Accommodated within the term "gas turbine engine" are, for example, turbojet engines, turbo-fan engines and open rotor turbojet engines.

A gas turbine engine generally includes one or more support structures, each one of which is adapted to provide at least one flow guiding passage. Moreover, a support structure may generally include one or more load carrying members extending between an inner housing and an outer housing. A support structure may be adapted to be moveable, e.g. rotatable, or fixed in relation to other portions of the gas turbine engine.

Traditionally, a support structure is manufactured by firstly providing an inner housing and an outer housing and subsequently attaching load carrying members, e.g., struts, each one of which extending between the inner and outer housings. The space delimited by a portion of the inner ring, a portion of the outer ring and adjacent struts may be regarded as a flow guiding passage. The traditional manufacturing method is generally time consuming and costly since it involves a plurality of manufacturing steps.

In order to improve the above manufacturing procedure, US 2004/0103534 A1 proposes that a stator component be manufactured by providing two stator sections, orienting the sections adjacent to one another in a circumferential direction of the stator and interconnecting the two sections by a cover wall in order to obtain a portion of the stator component.

Although the US 2004/0103534 A1 manufacturing procedure generally results in components with appropriate characteristics, from e.g., a structural and/or thermal point of view, there may nevertheless be a need for improvements of the US 2004/0103534 A1 manufacturing procedure.

SUMMARY

One object of the present disclosure is to provide a support structure that has appropriate structural and/or thermal characteristics but which may nevertheless be manufactured at a reasonable cost.

As such, the present disclosure relates to a support structure for a gas turbine engine. The support structure has an axial extension in an axial direction and a circumferential extension in a circumferential direction. Moreover, the support structure comprises a plurality of tubular members of a first material type arranged in sequence in the circumferential direction. Each tubular member at least partially delimits a flow guiding passage extending at least partially in the axial direction. The support structure comprises a leading portion and a trailing portion in the axial direction and the support structure comprises a leading edge member of a second material type. The leading edge member is located at the leading portion. At least two of the tubular members are fixedly attached to a leading edge member.

According to the present disclosure, the first material type is different from the second material type.

The above support structure implies that a material type with, e.g., a large structural and/or thermal capacity may be selectively used at locations with large structural and/or thermal loads. If for instance the support structure is used in a portion of an engine, which portion is located downstream of the combustion area of the engine, the leading edge may be subjected to larger structural and/or thermal loads as compared to the loads imparted on the tubular members. In such an implementation, the material type of the leading edge may have a higher structural and/or thermal capacity as compared to the corresponding capacity of the material type of the tubular members.

As used herein, the expression "material type" relates to the material as such as well as the manufacturing method thereof. Consequently, the feature that the first material type is different from the second material type encompasses that the first material type is constituted by a first material and that the second material type is constituted by a second material and that the first material is different from the second material. However, the feature that the first material type is different from the second material type also encompasses that the first and the second material types are constituted by the same, or at least similar, material but that the first material type has been manufactured in a different way as compared to the second material type to thereby impart different material type properties.

Optionally, the leading edge member comprises an inner leading edge segment, an outer leading edge segment, and at least one leading edge vane portion extending between the inner leading edge segment and the outer leading edge segment.

Optionally, at least two of the tubular members are fixedly attached to a leading edge member such that the leading edge vane portion forms a leading edge separating at least two tubular members.

Optionally, at least one of the inner leading edge ring segment and the outer leading edge ring segment forms a closed ring.

Optionally, the support structure comprises a trailing edge member of a third material type, the first material type being different from the third material type.

Optionally, the trailing edge member comprises an inner trailing edge ring segment, an outer trailing edge ring segment and at least one trailing edge vane portion extending between the inner trailing edge ring segment and the outer trailing edge ring segment. At least two of the tubular members are fixedly attached to a trailing edge member such that a trailing edge vane portion of the trailing edge member forms a trailing edge separating at least two fluid guiding passages.

Optionally, at least one of the inner trailing edge ring segment and the outer trailing edge ring segment forms a closed ring.

Optionally, the second material type is the same as the third material type.

Optionally, the first material type is sheet metal or a sheet metal alloy.

Optionally, the second material type is a cast metal, a cast metal alloy, a forged metal or a forged metal alloy.

Optionally, the support structure is a rotating support structure.

A second aspect of the present disclosure relates to a gas turbine engine comprising a support structure according to the first aspect of the present disclosure.

Optionally, the engine is an open rotor engine.

A third aspect of the present disclosure relates to an aeroplane comprising a gas turbine engine according to the second aspect of the present disclosure.

A fourth aspect of the present disclosure relates to a method for constructing a support structure for a gas turbine engine, the support structure having an axial extension in an axial direction and a circumferential extension in a circumferential direction, the method comprising:

providing two tubular members of a first material type at separate locations in the circumferential direction, each one of the tubular members being adapted to form a part of a fluid guiding passage of the support structure;

providing a first leading edge portion of a second material type, the first material type being different from the second material type, the first leading edge portion being adapted to form part of a leading edge member, and fixedly attaching the tubular members to the leading edge portion.

Optionally, the first leading edge portion comprises a leading edge vane portion and a leading edge ring portion, the leading edge ring portion being adapted to form part of an inner leading edge ring segment or an outer leading edge ring segment of the leading edge member, the method further comprising:

fixedly attaching the tubular members to the leading edge portion such that the leading edge vane portion forms a leading vane edge for the tubular members.

Optionally, the method further comprises:

providing a second leading edge portion, the second leading edge portion comprising a second leading edge vane portion and a second leading edge ring portion, the second leading edge ring portion being adapted to form part of an inner leading edge ring segment or an outer leading edge ring segment of a leading edge member, and fixedly attaching the second leading edge portion to the first leading edge portion in order to form a portion of an inner ring segment and/or the outer ring segment of the leading edge member.

Optionally, the method further comprises:

providing a first trailing edge portion of a third material type, the third material type being different from the first material type, the first trailing edge portion being adapted to form part of a trailing edge member, and fixedly attaching the tubular members to the trailing edge portion.

Optionally, the first trailing edge portion comprises a trailing edge vane portion and a trailing edge ring portion, the trailing edge ring portion being adapted to form part of an inner trailing edge ring segment or an outer trailing edge ring segment of the trailing edge member, the method further comprising:

fixedly attaching the tubular members to the trailing edge portion such that the trailing edge vane portion forms a trailing vane edge for the tubular members.

Optionally, the method further comprises:

providing a second trailing edge portion, the second trailing edge portion comprising a second trailing edge vane portion and a second trailing edge ring portion, the second trailing edge ring portion being adapted to form part of an inner trailing edge ring segment or an outer trailing edge ring segment of a trailing edge member, and fixedly attaching the second trailing edge portion to the first trailing edge portion in order to form a portion of the inner ring segment and/or the outer ring segment of the trailing edge member.

Optionally, the tubular members are fixedly attached to the first leading edge portion by means of welding.

Optionally, the first leading edge portion is fixedly attached to the second leading edge portion by means of welding.

Optionally, the tubular members are fixedly attached to the trailing edge portion by means of welding.

Optionally, the first trailing edge portion is fixedly attached to the second trailing edge portion by means of welding.

BRIEF DESCRIPTION OF THE DRAWINGS

The present disclosure will hereinafter be explained in greater detail by means of non-limiting examples and with reference to the appended drawings in which.

It should be noted that the appended drawings are not necessarily drawn to scale and that the dimensions of some may have been exaggerated for the sake of clarity.

DETAILED DESCRIPTION OF PREFERRED EMBODIMENTS

The disclosure will, in the following, be exemplified by embodiments. It is to be understood, however, that the embodiments are included in order to explain principles of the disclosure and not to limit the scope of the claims.

Figure 1:
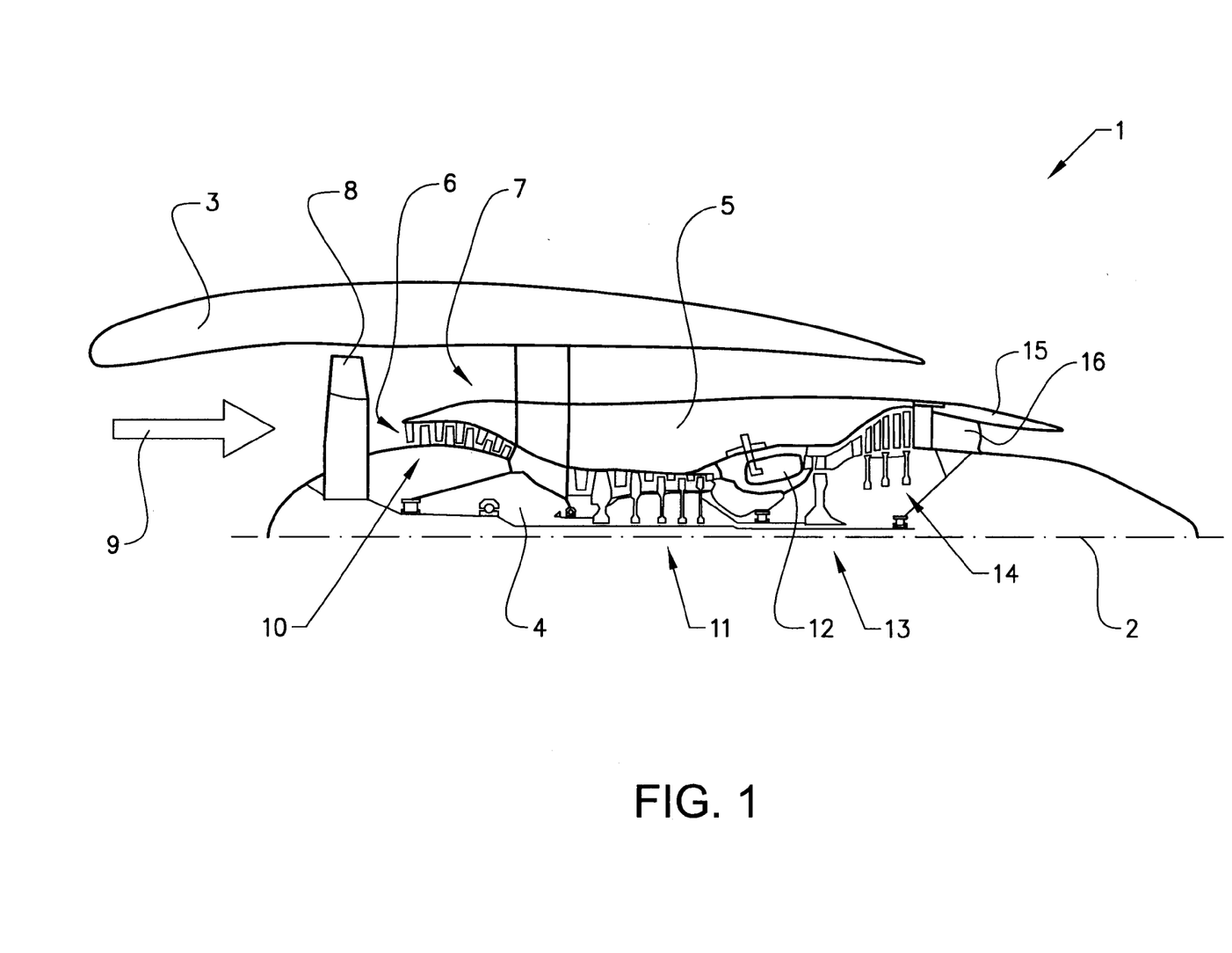
FIG. 1 is a schematic longitudinal sectional view illustration of an exemplary embodiment of an aircraft turbofan gas turbine engine.

FIG. 1 illustrates a two-shaft turbofan gas turbine aircraft engine 1, which is circumscribed about an engine longitudinal central axis 2. The engine 1 comprises an outer casing or nacelle 3, an inner casing 4 (rotor) and an intermediate casing 5. The intermediate casing 5 is concentric to the first two casings and divides the gap between them into an inner primary gas channel 6 for the compression of air and a secondary channel 7 through which the engine bypass air flows. Thus, each of the gas channels 6, 7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13, and a low pressure turbine (LPT) 14 from which the combustion gases are discharged from the engine.

A high pressure shaft joins the high pressure turbine 13 to the high pressure compressor 11 to substantially form a high pressure rotor. A low pressure shaft joins the low pressure turbine 14 to the low pressure compressor 10 to substantially form a low pressure rotor. The low pressure shaft is at least in part rotatably disposed co-axially with, and radially inwardly of, the high pressure rotor.

The FIG. 1 engine 1 further comprises a turbine exhaust casing 15 located downstream of the high pressure turbine 13. The turbine exhaust casing 15 comprises a support structure 16.

Figure 2A:
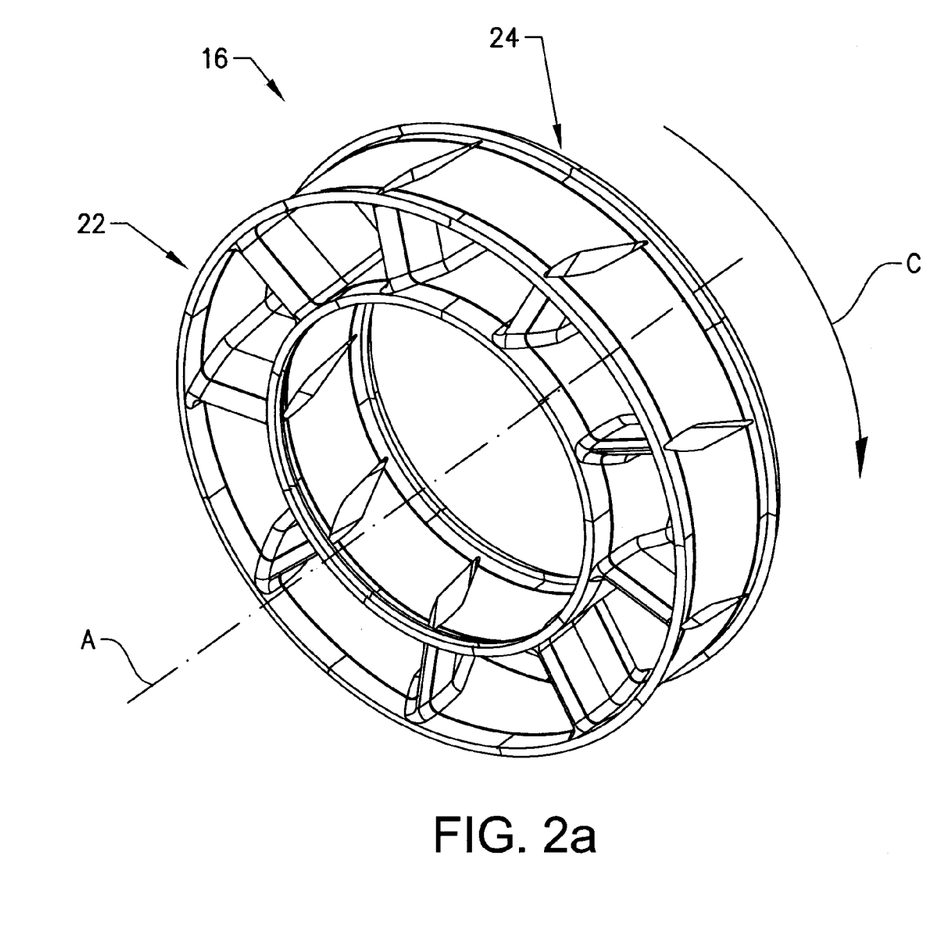
FIG. 2a is a schematic view of an embodiment of a support structure.

FIG. 2a illustrates the FIG. 1 support structure 16. As may be gleaned from FIG. 2a, the structure has an axial extension in an axial direction A and a circumferential extension in a circumferential direction C. Purely by way of example, the axial direction A may generally be parallel to the engine longitudinal central axis 2, see FIG. 1. Moreover, the support structure 16 comprises a leading portion 22 and a trailing portion 24 in the axial direction A.

Figure 2B:
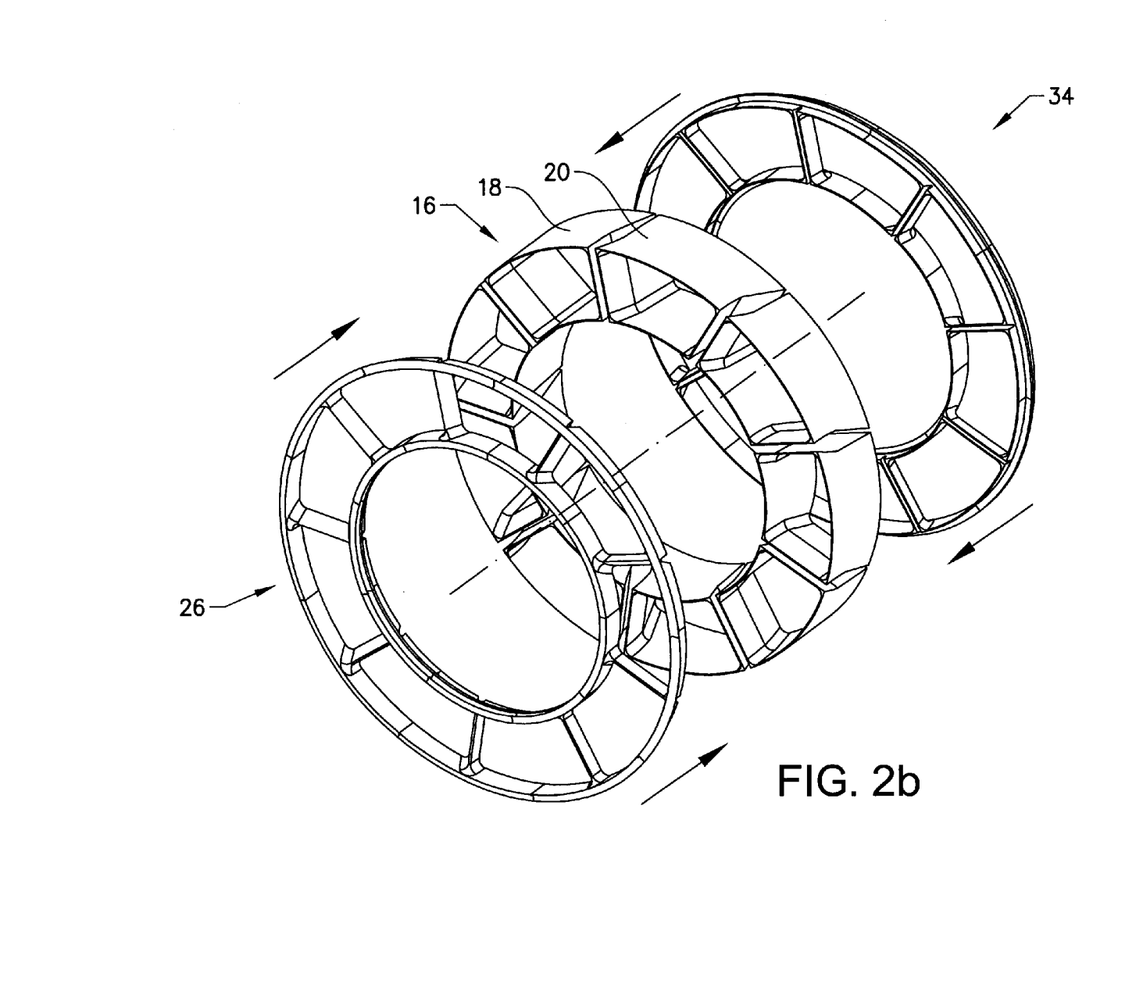
FIG. 2b is an exploded view of the FIG. 2a support structure.

FIG. 2b illustrates that the support structure 16 comprises a plurality of tubular members 18, 20 of a first material type arranged in sequence in the circumferential direction C. Each one of the tubular members 18, 20 at least partially delimits a flow guiding passage extending at least partially in the axial direction A.

Moreover, FIG. 2b illustrates that the support structure 16 comprises a leading edge member 26 of a second material type. The leading edge member 26 is located at the leading portion 22 (see FIG. 2a). At least two of the tubular members 18, 20 are fixedly attached to the leading edge member. However, for the sake of clarity, an exploded view of the support structure 16 is illustrated in FIG. 2b. The first material type may be different from the second material type.

Purely by way of example, the first material type is sheet metal or a sheet metal alloy. Moreover, and again purely by way of example, the second material type is a cast metal, a cast metal alloy, a forged metal or a forged metal alloy.

The actual material of the first and second material types may be dependent on inter alia the intended position of the support structure 16. Purely by way of example, the material of either one of the first and second material types may be a nickel alloy, titanium, a titanium alloy, a steel alloy, aluminum or an aluminum alloy.

Figure 2C:
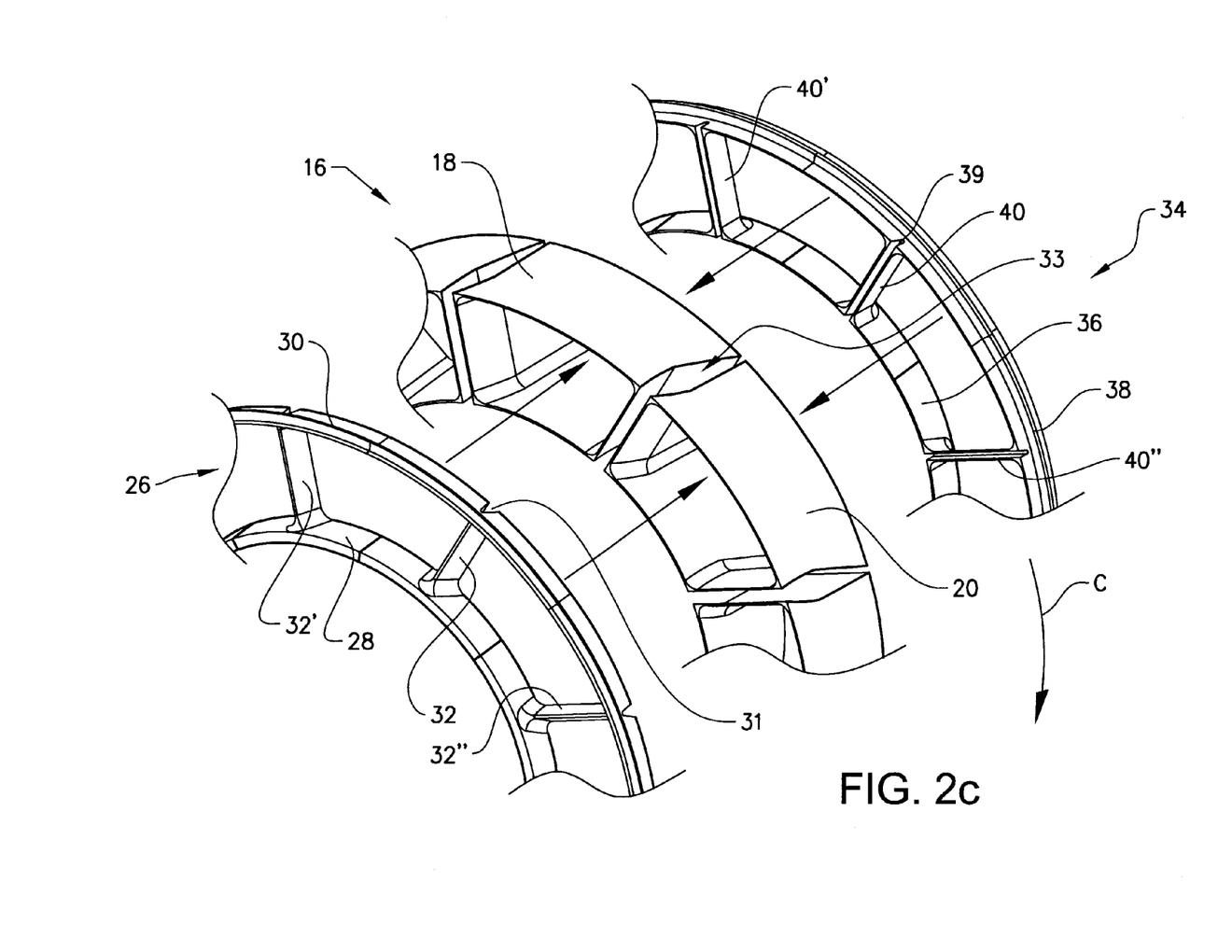
FIG. 2c illustrates a portion of the FIG. 2b view.

As may be realized from FIG. 2c, the leading edge member 26 may include an inner leading edge segment 28, an outer leading edge segment 30 and at least one leading edge vane portion 32 extending between the inner leading edge segment 28 and the outer leading edge segment 30. At least the leading edge vane portion 32 may be free from weld joints.

FIG. 2c further implies that at least two of the tubular members 18, 20 may be fixedly attached to a leading edge member 26 such that the leading edge vane portion 32 forms a leading edge separating at least two tubular members 18, 20. Moreover, the leading edge vane portion 32 and portions of the tubular members 18, 20 may form a cavity 33 which may be used for accommodating e.g. conduits (not shown) and/or cables (not shown). The leading edge vane portion 32 may either be solid or, as illustrated in FIG. 2c, provided with a cavity 31 facing the tubular members 18, 20. Purely by way of example, the purpose of the cavity 31 may be to obtain a distance, in the circumferential direction C, between the tubular members 18, 20.

At least one of the inner leading edge segment 28 and the outer leading edge segment 30 may form a closed ring. In the embodiment illustrated in FIG. 2c, the inner leading edge segment as well as the outer leading edge segment form closed rings. As such, the leading edge member 26 in the FIGS. 2a-2c embodiment comprises a plurality of leading edge vane portions 32, 32', 32", each one of which being fixedly attached to two tubular members 18, 20. However, in other embodiments of the support structure 16, at least one of the inner leading edge segment 28 and the outer leading edge segment 30 may form an open ring, i.e. a ring segment (not shown).

FIG. 2c also illustrates that the support structure 16 may comprise a trailing edge member 34 of a third material type. The first material type is different from the third material type. Purely by way of example, the third material type may be the same as the second material type. Moreover, the trailing edge member 34 is located at the trailing portion 24 of the support structure 16 (see FIG. 2a).

Moreover, FIG. 2c illustrates that the trailing edge member 34 comprises an inner trailing edge ring segment 36, an outer trailing edge ring segment 38 and at least one trailing edge vane portion 40 extending between the inner trailing edge ring segment 36 and the outer trailing edge ring segment 38. At least two of the tubular members 18, 20 may be fixedly attached to a trailing edge member 34 such that a trailing edge vane portion 40 of the trailing edge member 34 forms a trailing edge separating at least two tubular members 18, 20. The trailing edge vane portion 40 may either be solid or, as 5 illustrated in FIG. 2c, provided with a cavity 39 facing the tubular members 18, 20.

At least the trailing edge vane portion 40 may be free from weld joints.

At least one of the inner trailing edge segment 36 and the outer trailing edge segment 38 may form a closed ring. In the embodiment illustrated in FIG. 2c, the inner trailing edge segment 36 as well as the outer trailing edge 38 segment form closed rings. As such, the trailing edge member 34 in the FIG. 2 embodiment comprises a plurality of trailing edge vane portions 40, 40', 40" each one of which being fixedly attached to two tubular members 18, 20. However, in other embodiments of the support structure 16, at least one of the inner trailing edge segment 36 and the outer trailing edge ring segment 38 may form an open ring, i.e., a ring segment (not shown).

FIG. 3a to FIG. 4b illustrates an embodiment of a method for constructing a support structure 16 for a gas turbine engine 1.

Figures 3A, 3B:
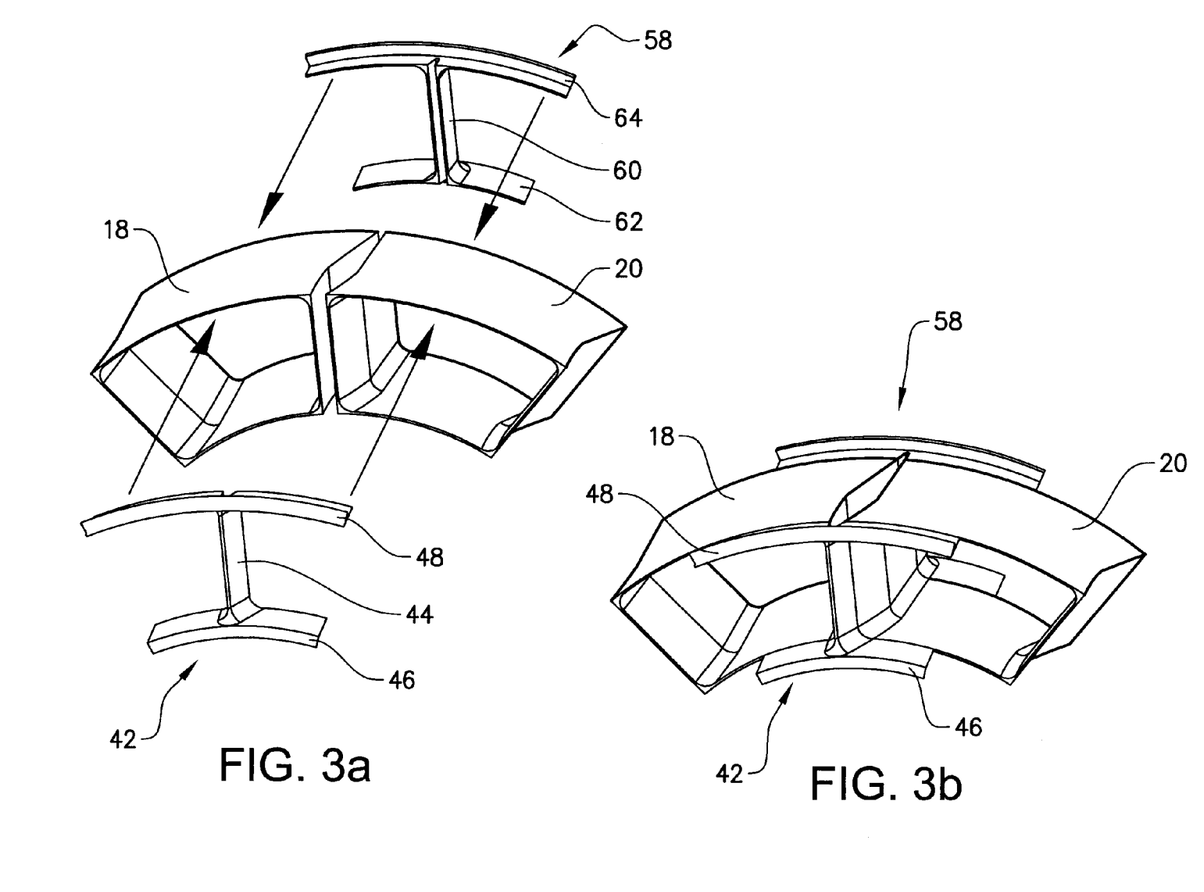
FIGS. 3a and 3b are schematic views illustrating an embodiment of a construction method.

According to the proposed method, and as is indicated in FIG. 3a, two tubular members 18, 20 of a first material type are provided at separate locations in the intended circumferential direction C of the support structure to be constructed. Purely by way of example, the tubular members 18, 20 may be placed in a fixture (not shown) in order to ensure that the tubular members 18, 20 assume appropriate positions. Each one of the tubular members 18, 20 is adapted to form a part of a fluid guiding passage of the support structure. As has been intimated hereinabove, the first material type may be a sheet metal or a sheet metal alloy.

FIG. 3a illustrates that the construction method further comprises that a first leading edge portion 42 of a second material type is provided. The second material type is different from the first material type and the second material type may be a cast metal, a cast metal alloy, a forged metal or a forged metal alloy. The first leading edge portion 42 is adapted to form a leading edge member (not shown in FIG. 3) of the support structure.

As may be gleaned from FIG. 3a, the first leading edge portion 42 may include a leading edge vane portion 44 and a leading edge ring portion 46, 48 wherein the leading edge ring portion 46, 48 is adapted to form part of an inner leading edge ring segment or an outer leading edge ring segment of the leading edge member. In fact, the implementation of the first leading edge portion 42 illustrated in FIG. 3a comprises two leading edge ring portions, viz an inner 46 and an outer 48 leading edge portion. The inner leading edge portion 46 is adapted to form a part of the inner leading edge ring, whereas the outer leading edge portion 48 is adapted to form a part of the outer leading edge ring. The first leading edge portion 42, comprising leading edge vane portion 44 and at least one leading edge ring portion 46, 48, may be made in one piece, e.g. by means of casting or forging.

However, in other embodiments, the first leading edge portion 42 may comprise more or fewer portions than the FIG. 3a first leading portion. Purely by way of example, in other embodiments of the method, the first leading edge portion 42 may comprise only a leading edge vane portion 44.

Moreover, in other embodiments, the first leading edge portion 42 may comprise a fully enclosing inner leading edge ring and/or a fully enclosing outer leading edge ring (not shown), for example, with a plurality of leading edge vane portions (not shown), each one of which extending from at least one of the inner or outer rings (not shown).

The present embodiment of the method further comprises that the tubular members 18, 20 are fixedly attached to the leading edge portion 42. In the FIG. 3b embodiment of the method, the tubular members 18, 20 are fixedly attached to the leading edge portion 42 such that the leading edge vane portion 44 forms a leading vane edge for the tubular members 18, 20. Moreover, in the FIG. 3b embodiment of the method, each one of the inner 46 and outer 48 leading edge portions is fixedly attached to a portion of each one of the tubular members 18, 20. The tubular members 18, 20 may be fixedly attached to the first leading edge portion 42 by welding. However, it should be noted that other attachment methods could be used instead such as soldering (e.g. laser soldering) or bolting.

Figures 4A, 4B:
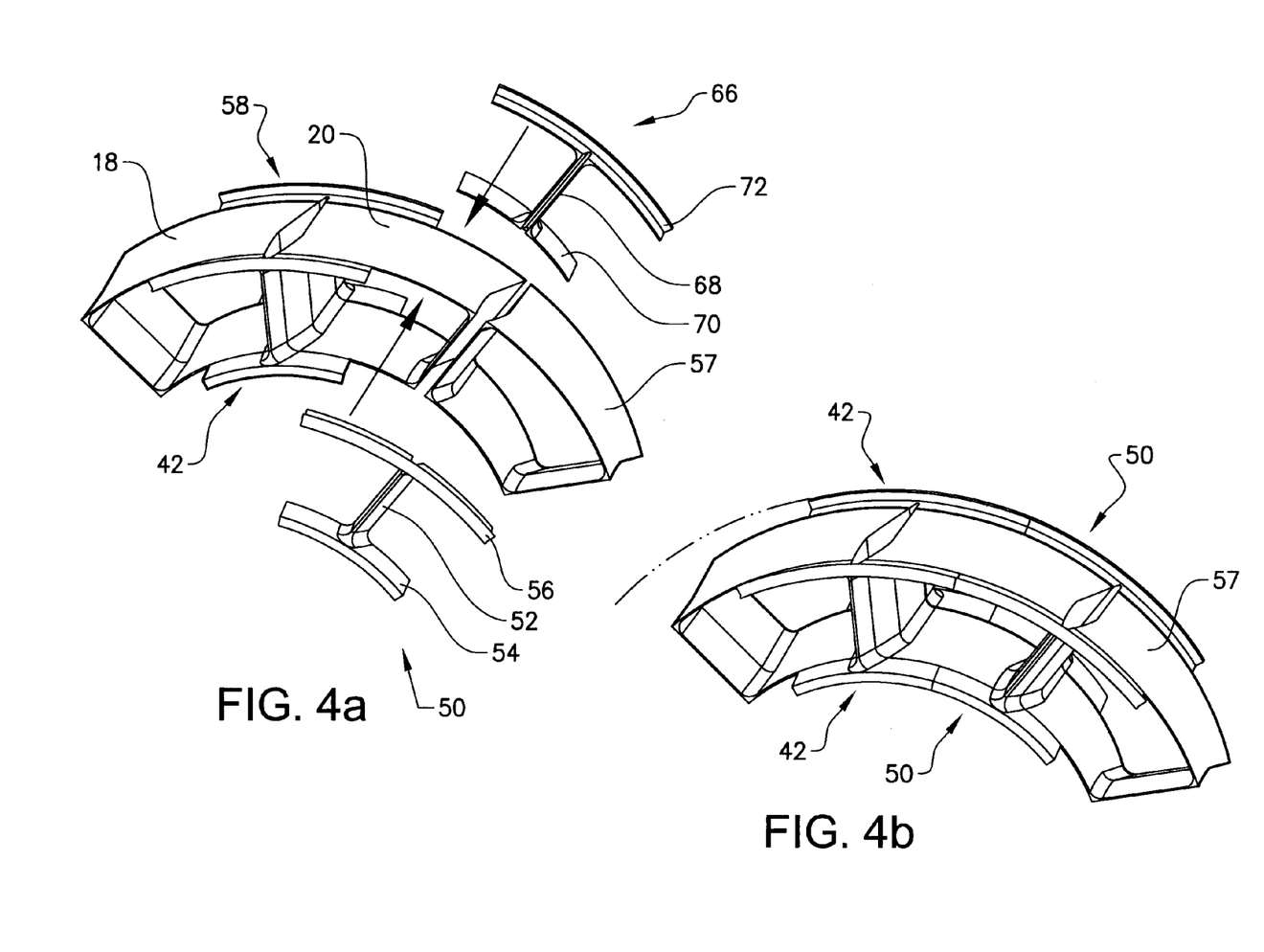
FIGS. 4a and 4b are schematic views illustrating further sequences of the FIG. 3a and FIG. 3b method.

FIG. 4a and FIG. 4b illustrate an embodiment of the method wherein the FIG. 3a and FIG. 3b assembly of two tubular members 18, 20 and the first leading edge portion 42, have been fixedly attached to one another. In the FIG. 3a to FIG. 4b embodiment, the method further comprises that a second leading edge portion 50 is provided. In the FIG. 4a embodiment, the second leading edge portion 50 comprises a second leading edge vane portion 52 and a second leading edge ring portion 54, 56 wherein the second leading edge ring portion 54, 56 is adapted to form part of an inner leading edge ring segment or an outer leading edge ring segment of the leading edge member.

In fact, the implementation of the second leading edge portion 50 illustrated in FIG. 4a comprises two second leading edge ring portions, viz an inner 54 and an outer 56 second leading edge portion. The inner second leading edge portion 54 is adapted to form a part of the inner leading edge ring (not shown in FIG. 4a) whereas the outer second leading edge portion 56 is adapted to form a part of the outer leading edge ring (not shown in FIG. 3).

The method of FIG. 4a further proposes that the second leading edge portion 50 is fixedly attached to the first leading edge portion 42 in order to form a portion of an inner ring segment and/or the outer ring segment of the leading edge member. The second leading edge portion 50 may be fixedly attached to the first leading edge portion 42 by welding. Moreover, the second leading edge portion 50 may be fixedly attached to at least one of the tubular members 18, 20 which is also attached to the first leading edge portion 42. Moreover, the second leading edge portion 50 may be fixedly attached to at least one additional tubular member 57 that is adapted to be located adjacent to the one of the two tubular members 18, 20 forming an assembly with the first leading edge portion 42.

The additional tubular member 57 may for instance be a separate tubular member 57 such that that the tubular member assembly includes three tubular members 18, 20, 57 once the second leading edge portion 50 has been fixedly attached to the additional tubular member 57 and the assembly of the first two tubular member 18, 20.

However, the additional tubular member 57 may also form a part of an assembly that comprises two tubular members, identical or at least similar to the assembly 18, 20, 42 illustrated in FIG. 3, such that two pairs of tubular members are fixedly attached to one another by means of the second leading edge portion 50.

FIG. 3a to FIG. 4b further illustrate that embodiments of the method may comprise that a first trailing edge portion 58 of a third material type is provided. The third material type is different from the first material type. The third material type may be the same as the second material type. Moreover, and purely by way of example, the third material type may be a cast metal, a cast metal alloy, a forged metal or a forged metal alloy.

The first trailing edge portion 58 is adapted to form part of a trailing edge member of the support structure to be constructed. In embodiments of the method, the tubular members 18, 20 may be fixedly attached to the first trailing edge portion 58, for example, by welding. Moreover, and as is indicated in FIG. 4a, in embodiments of the method a second trailing edge portion 66 may be fixedly attached to the first trailing edge portion 58.

It should be noted that every feature that has been previously discussed for the first and second leading edge portions 42, 50 are equally applicable options for the first and second trailing edge portions 58, 66. As such, the first leading edge portion 58 may for instance comprise a first trailing edge vane portion 60 and a first 62 and/or a second 64 trailing edge ring portion. In a similar vein, the second leading edge portion 66 may for instance comprise a second trailing edge vane portion 68 and a first 70 and a second 72 trailing edge ring portion.

As an alternative to the method proposed in relation to FIG. 3a to FIG. 4b, FIG. 5a to FIG. 6 illustrate another embodiment of the method for constructing a support structure 16.

Figure 5A:
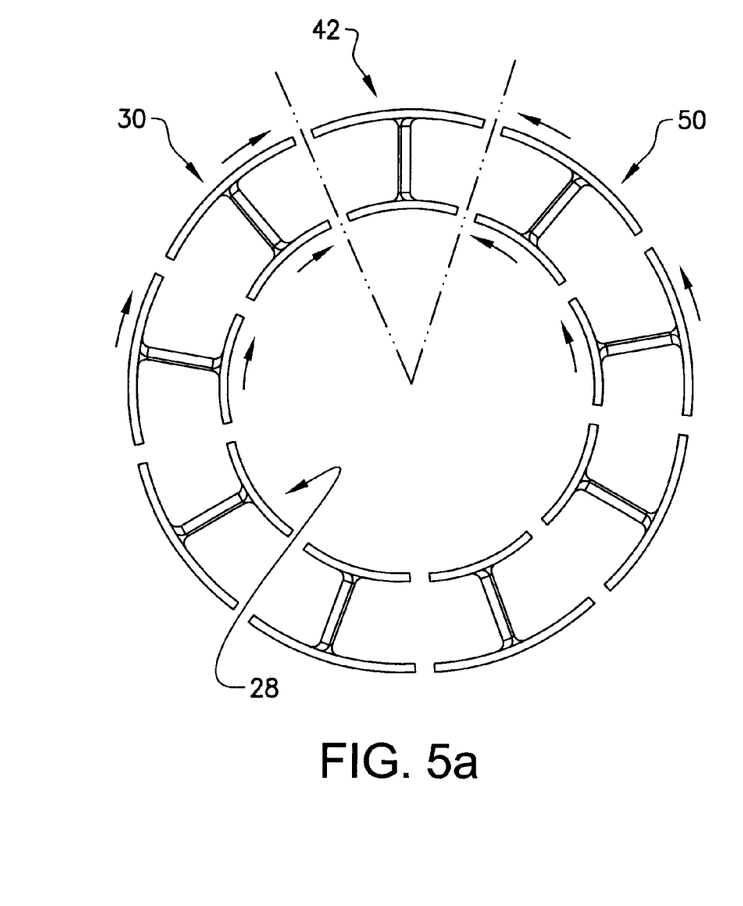
FIGS. 5a and 5b are schematic views illustrating another embodiment of construction method.
Figure 5B:
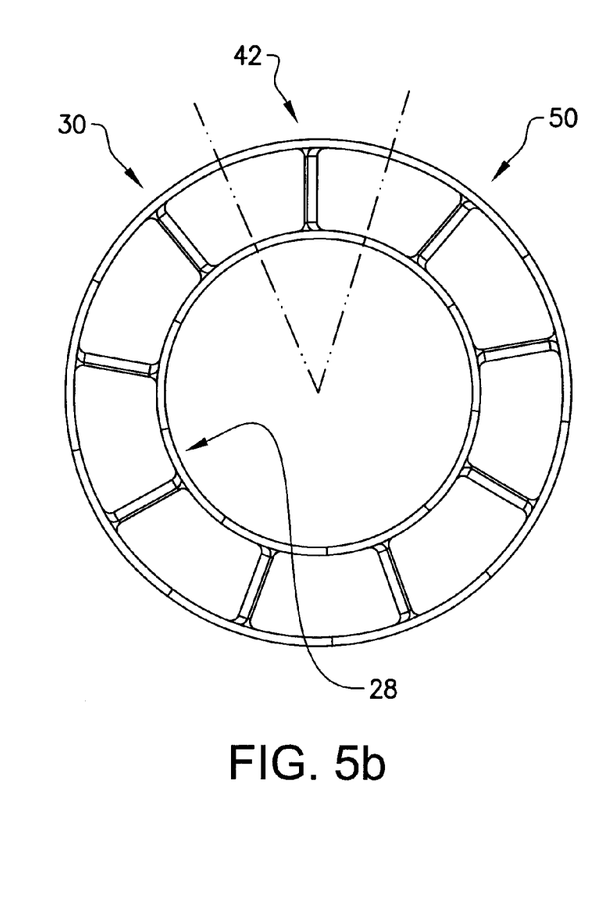
Figure 6:
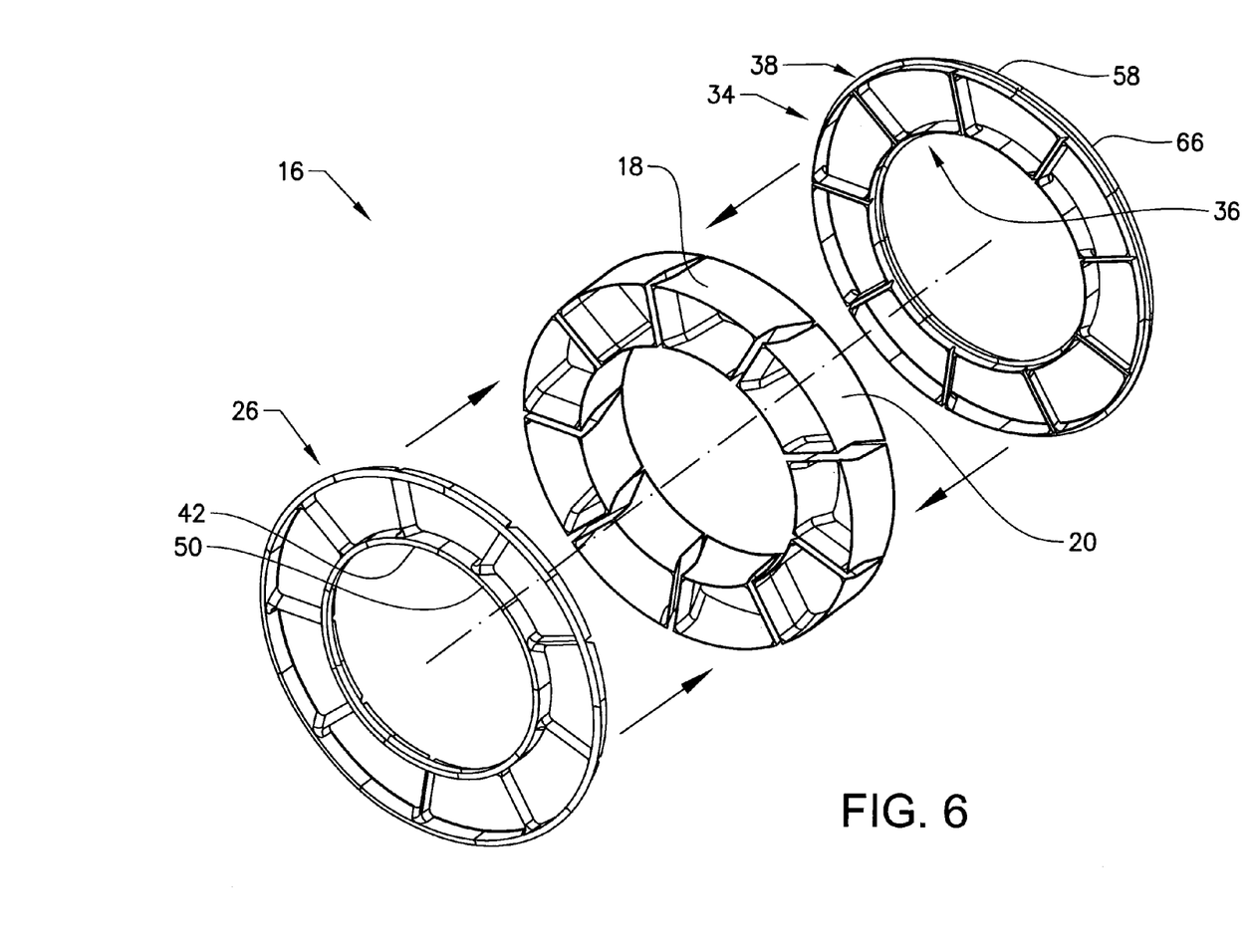
FIG. 6 is a schematic view illustrating another sequence of the FIG. 5a and FIG. 5b method.

In the method illustrated in FIG. 5a to FIG. 6, a plurality of leading edge portions 42, 50 are attached to one another so as to form a leading edge member 26 with an inner leading edge segment 28 and/or an outer leading edge segment 30. In the FIG. 5a to FIG. 6 embodiment, the plurality of leading edge portions 42, 50 are attached to one another so as to form a closed inner leading edge segment 28 as well as a closed outer leading edge segment 30. However, in other embodiments of the construction method, leading edge portions 42, 50 may be attached to one another so as to form an open inner leading edge segment 28 and/or an open outer leading edge segment 30 (not shown).

In order to ensure that the inner leading edge segment 28 and/or the outer leading edge segment 30 obtains a desired shape prior to the subsequent attachment of tubular members (not shown in FIG. 5a or FIG. 5b), the plurality of leading edge portions 42, 50 may be prevented from relative displacement during the procedure of attaching together the leading edge portions 42, 50.

Purely by way of example, the prevention of relative displacement between the leading edge portions 42, 50 may be achieved by placing the leading edge portions 42, 50 in a fixture (not shown) prior to performing the operation for fixedly attaching together the leading edge portions 42, 50. Instead of, or in addition to, the use of a fixture, the leading edge portions 42, 50 may firstly be temporarily attached to one another by means of e.g. tack welding (not shown).

In a similar vein as for the leading edge member 26, an embodiment of the construction method may comprise that a plurality of trailing edge portions 58, 66 are attached to one another so as to form a trailing edge member 34 with an inner trailing edge segment 36 and/or an outer leading edge segment 38 prior to attaching tubular members to the trailing members. As for the leading edge member 26, at least one of the inner trailing edge segment 36 and the outer leading edge segment 38 may be closed.

FIG. 6 illustrates that once the leading edge member 26, comprising a plurality of attached leading edge portions 42, 50, has been obtained, the tubular members 18, 20 are attached to the thus obtained leading edge member 26.

FIG. 6 further illustrates that the previously obtained trailing edge member 34, comprising a plurality of attached trailing edge portions 58, 66, may subsequently be attached to the tubular members 18, 20.

It will be understood that various omissions and substitutions and changes in the form and details of the devices illustrated, and in their operation, may be made by those skilled in the art.

For instance, even though the first and second leading edge portions 42, 50 have been exemplified as substantially H-shaped elements, each one of the leading edge portions 42, 50 could in other embodiments instead have other shapes. One advantage of the substantially H-shaped elements may however be that joints, e.g. weld joints, between adjacent leading edge portions 42, 50 may be located at an appropriate distance from the leading edges of the support structure 16. This in turn implies that such joints are not located in the most loaded area of the support structure.

Figure 7A:
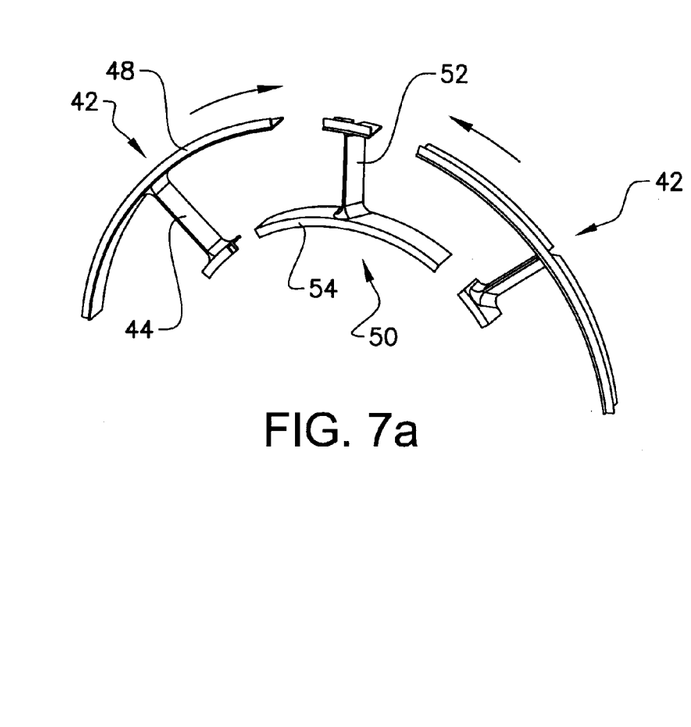
FIGS. 7a and 7b are schematic views of another embodiment of a support structure.

However, as an alternative to the substantially H-shaped elements, reference is made to FIG. 7a that illustrates an embodiment wherein the first leading edge portion 42 comprises a leading edge vane portion 44 and a leading edge outer ring portion 48, whereas the second leading edge portion 50 comprises a second leading edge vane portion 52 and a leading edge inner ring portion 54. As such, in the implementation illustrated in FIG. 7, each one of the first and second leading edge portions 42, 50 are substantially T-shaped.

Figure 7B:
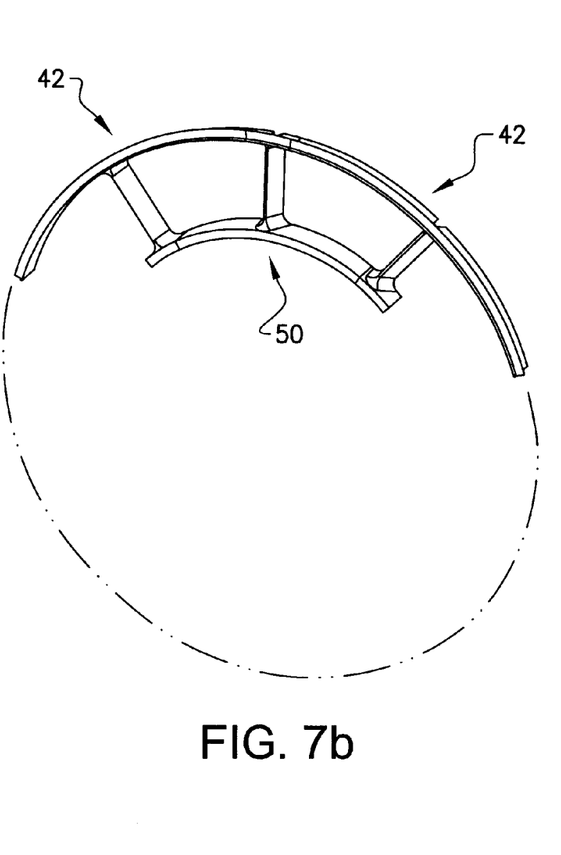

In other words, when the first and second leading edge portions 42, 50 are attached to one another, see FIG. 7b, the leading edge outer ring portion 48 of the first leading edge portions 42 is in contact with the second leading edge vane portion 52 of the second leading edge portion 50. In a similar vein, when the first and second leading edge portions 42, 50 are attached to one another, the leading edge inner ring portion 54 is in contact with the leading edge vane portion 44 of the first leading edge portion 42.

Figure 8:
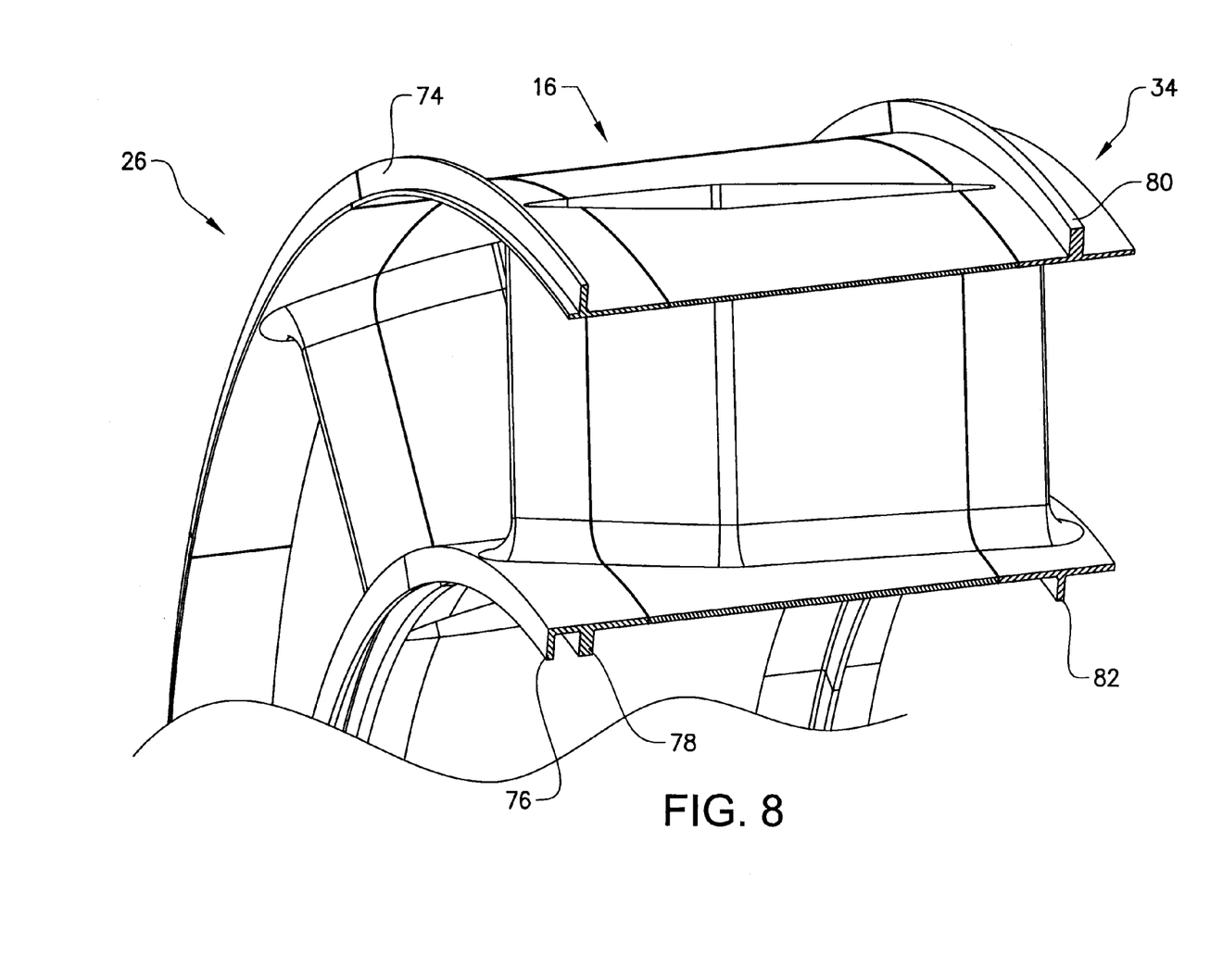
FIG. 8 is a schematic view illustrating another embodiment of a support structure.

It should also be noted that, in embodiments of the support structure 16, at least one of the leading edge member 26 and the trailing edge member 34 may comprise one or more flanges for attachment to other portions of a gas turbine engine of which the support structure is intended to form a part. To this end, reference is made to FIG. 8 illustrating an embodiment of a support structure 16 comprising a leading edge member 26 that in turn comprises an outer flange 74 and two inner flanges 76, 78. In a similar vein, the trailing edge member 34 of the FIG. 8 support structure 16 comprises an outer flange 80 and an inner flange 82. Each one of the flanges 74, 76, 78, 80, 82 in FIG. 8 forms a closed ring, but in other embodiments of the support structure 16 at least one of the above flanges (not shown) may extend over only a portion of the circumference of the support structure 16.

Moreover, it is expressly intended that all combinations of those elements and/or method steps which perform substantially the same function in substantially the same way to achieve the same results are within the scope of the disclosure.

For instance, although the support structure 16, as well as the method for constructing a support structure, have been exemplified as a static support structure, the support structure, as well as the method for constructing the same, may be equally applicable for a rotating support structure. Purely by way of example, the support structure 16 may be used in at least one of the following locations in a gas turbine engine: a turbine centre frame, turbine mid frame, tail bearing housing, turbine exhaust case and turbine rear frame.

Furthermore, in other embodiments, the support structure 16 may be located in another type of gas turbine engine. Purely by way of example, an embodiment of the support structure 16 may be located in a gas turbine engine that includes only one rotating shaft (not shown) connecting a turbine to a compressor.

Moreover, and again purely by way of example, an embodiment of the support structure 16 may be located in a gas turbine engine that includes three or more rotating shafts (not shown).

Moreover, it should be recognized that structures and/or elements and/or method steps shown and/or described in connection with any disclosed form or embodiment may be incorporated in any other disclosed or described or suggested form or embodiment as a general matter of design choice. It is the intention, therefore, to be limited only as indicated by the scope of the claims appended hereto.

The invention claimed is:

1. A support structure for a gas turbine engine, said support structure comprising:
   an axial extension in an axial direction and a circumferential extension in a circumferential direction;
   a plurality of separate tubular members of a first material type arranged in sequence in said circumferential direction, each tubular member at least partially delimiting a flow guiding passage extending at least partially in said axial direction;
   a leading portion and a trailing portion in said axial direction;
   a leading edge member of a second material type, said leading edge member being located at said leading portion, at least two of said tubular members being fixedly attached to the leading edge member; and a trailing edge member, said trailing edge member being located at said trailing portion, at least two of said tubular members being fixedly attached to the trailing edge member;

said first material type being different from said second material type;

wherein said leading edge member includes an inner leading edge segment, an outer leading edge segment, and at least one leading edge vane portion extending between said inner leading edge segment and said outer leading edge segment;

said trailing edge member includes an inner trailing edge segment, an outer trailing edge segment, and at least one trailing edge vane portion extending between said inner trailing edge segment and said outer trailing edge segment;

at least two of said tubular members are fixedly attached to each of the leading edge member and the trailing edge member such that said leading edge vane portion and said trailing edge vane portion form a leading edge and a trailing edge respectively separating the at least two tubular members to form a tubular-member cavity between them;

wherein each of said at least two tubular members engages said inner leading edge segment, said outer leading edge segment, and said leading edge vane portion;

wherein each of said at least two tubular members engages said inner trailing edge segment, said outer trailing edge segment, and said trailing edge vane portion; and each of the leading edge vane portion and the trailing edge vane portion comprise a vane-portion cavity, wherein each vane-portion cavity is configured to communicate with the tubular-member cavity formed between the at least two tubular members.

2. The support structure according to claim 1, wherein at least one of said inner leading edge segment and said outer leading edge segment forms a closed ring.

3. The support structure according to claim 1, wherein the trailing edge member is of a third material type, said first material type being different from said third material type.

4. The support structure according to claim 1, wherein at least one of said inner trailing edge ring segment and said outer trailing edge segment forms a closed ring.

5. The support structure according to claim 3, wherein said second material type is the same as said third material type.

6. The support structure according to claim 1, wherein said first material type is sheet metal or a sheet metal alloy.

7. The support structure according to claim 1, wherein said second material type is a cast metal, a cast metal alloy, a forged metal or a forged metal alloy.

8. A gas turbine engine comprising:
a support structure including an axial extension in an axial direction and a circumferential extension in a circumferential direction, the support structure including a plurality of separate tubular members of a first material type arranged in sequence in said circumferential direction, each tubular member at least partially delimiting a flow guiding passage extending at least partially in said axial direction;

the support structure including a leading portion and a trailing position in said axial direction;

the support structure including a leading edge member of a second material type, said leading edge member being located at said leading portion, at least two of said tubular members being fixedly attached to the leading edge member; and the support structure including a trailing edge member, said trailing edge member being located at said trailing portion, at least two of said tubular members being fixedly attached to the tailing edge member;

said first material type being different from said second material type;

wherein said leading edge member includes an inner leading edge segment, an outer leading edge segment, and at least one leading edge vane portion extending between said inner leading edge segment and said outer leading edge segment;

said trailing edge member includes an inner trailing edge segment, an outer trailing edge segment, and at least one trailing edge vane portion extending between said inner trailing edge segment and said outer trailing edge segment;

at least two of said tubular members are fixedly attached to each of the leading edge member and the trailing edge member such that said leading edge vane portion and said trailing edge vane portion form a leading edge and a trailing edge respectively separating the at least two tubular members to form a tubular-member cavity between them;

wherein each of said at least two tubular members engages said inner leading edge segment, said outer leading edge segment, and said leading edge vane portion;

wherein each of said at least two tubular members engages said inner trailing edge segment, said outer trailing edge segment, and said trailing edge vane portion; and each of the leading edge vane portion and the trailing edge vane portion comprise a vane-portion cavity, wherein each vane-portion cavity is configured to communicate with the tubular-member cavity formed between the at least two tubular members.

9. An aeroplane comprising the gas turbine engine according to claim 8.

10. A method for constructing a support structure for a gas turbine engine, said support structure having an axial extension in an axial direction and a circumferential extension in a circumferential direction, said method comprising:

providing at least two separate tubular members of a first material type at separate locations in said circumferential direction, each one of said tubular members being adapted to form a part of a fluid adding passage of said support structure;

providing a first leading edge portion of a second material type, said first material type being different from said second material type, said first leading edge portion being adapted to form part of a leading edge member;

providing a first trailing edge portion, said first trailing edge portion being adapted to form part of a trailing edge member; and fixedly attaching said tubular members to said first leading edge portion and to said first trailing edge portion;

wherein said leading edge member includes an inner leading edge segment, an outer leading edge segment, and at least one leading edge vane portion extending between said inner leading edge segment and said outer leading edge segment;

said trailing edge member includes an inner trailing edge segment, an outer trailing edge segment, and at least one trailing edge vane portion extending between said inner trailing edge segment and said outer trailing edge segment;

at least two of said tubular members are fixedly attached to each of the leading edge member and the trailing edge member such that said leading edge vane portion and said trading edge vane portion form a leading edge and a trailing edge respectively separating the at least two tubular members to form a tubular-member cavity between them;

wherein each of said at least two tubular members engages said inner leading edge segment, said outer leading edge segment, and said leading edge vane portion;

wherein each of said at least two tubular members engages said inner trailing edge segment, said outer trailing edge segment, and said trailing edge vane portion; and each of the leading edge vane portion and the trailing edge vane portion comprise is a vane-portion cavity, wherein each vane-portion cavity is configured to communicate with the tubular-member cavity formed between the at least two tubular members.

11. The method according to claim 10, wherein said first leading edge portion includes a leading edge ring portion, said leading edge ring portion being adapted to form part of an inner leading edge ring segment or an outer leading edge ring segment of said leading edge member.

12. The method according to claim 10, said method further comprising:

providing a second leading edge portion, said second leading edge portion including a second leading edge vane portion and a second leading edge ring portion, said second leading edge ring portion being adapted to form part of an inner leading edge ring segment or an outer leading edge ring segment of the leading edge member; and fixedly attaching said second leading edge portion to said first leading edge portion in order to form a portion of said inner leading edge ring segment and/or said outer leading edge ring segment of said leading edge member.

13. The method according to claim 10, wherein:

the first trailing edge portion is of a third material type, said third material type being different from said first material type.

14. The method according to claim 10, said method further comprising:

providing a second trailing edge portion, said second trailing edge portion including a second trailing edge vane portion and a second trailing edge ring portion, said second trailing edge ring portion being adapted to form part of the inner trailing edge segment or the outer trailing edge segment of the trailing edge member; and fixedly attaching said second trailing edge portion to said first trailing edge portion in order to form a portion of said inner trailing edge segment and/or said outer trailing edge segment of said trailing edge member.

15. The method according to claim 10, wherein said tubular members are fixedly attached to said first leading edge portion by welding.

16. The method according to claim 12, wherein said first leading edge portion is fixedly attached to said second leading edge portion by welding.

17. The method according to claim 13, wherein said tubular members are fixedly attached to said first trailing edge portion by welding.

18. The method according to claim 14, wherein said first trailing edge portion is fixedly attached to said second trailing edge portion by welding.

* * * * *

UNITED STATES PATENT AND TRADEMARK OFFICE
CERTIFICATE OF CORRECTION

PATENT NO.         : 9,951,692 B2
APPLICATION NO.    : 14/367324
DATED              : April 24, 2018
INVENTOR(S)        : Egon Aronsson et al.

It is certified that error appears in the above-identified patent and that said Letters Patent is hereby corrected as shown below:

In the Claims

Column 11, in Line 65, replace "trailing position in" with -- trailing portion in --.

Column 12, in Line 50, replace "fluid adding passage" with -- fluid guiding passage --.

Signed and Sealed this
Fifth Day of June, 2018

Andrei Iancu
*Director of the United States Patent and Trademark Office*